(12) United States Patent
Chen et al.

(10) Patent No.: US 7,539,272 B2
(45) Date of Patent: May 26, 2009

(54) FREQUENCY ERROR ESTIMATION AND CORRECTION IN A SAIC LINEAR EQUALIZER

(75) Inventors: Weizhong Chen, Austin, TX (US); Clark H. Jarvis, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 597 days.

(21) Appl. No.: 11/290,367

(22) Filed: Nov. 30, 2005

(65) Prior Publication Data

US 2007/0121764 A1 May 31, 2007

(51) Int. Cl.
*H04L 27/06* (2006.01)
(52) U.S. Cl. ..................................... 375/340
(58) Field of Classification Search ............... 375/230, 375/232, 262, 316, 340–341, 346, 350
See application file for complete search history.

(56) References Cited

U.S. PATENT DOCUMENTS

| | | | | |
|---|---|---|---|---|
| 5,311,557 A | * | 5/1994 | Betts et al. | 375/341 |
| 6,625,236 B1 | * | 9/2003 | Dent et al. | 375/341 |
| 7,006,811 B2 | * | 2/2006 | Pukkila | 455/278.1 |
| 7,308,056 B2 | * | 12/2007 | Pukkila et al. | 375/348 |
| 2002/0181615 A1 | * | 12/2002 | Kuzminskiy et al. | 375/316 |
| 2004/0005018 A1 | * | 1/2004 | Zhu et al. | 375/340 |
| 2004/0258171 A1 | * | 12/2004 | Akita et al. | 375/260 |

* cited by examiner

*Primary Examiner*—Khanh C Tran
(74) *Attorney, Agent, or Firm*—Dillon & Yudell LLP

(57) ABSTRACT

Different from conventional equalizers, the output of an SAIC (Single Antenna Interference Cancellation) linear equalizer in GSM/EDGE wireless communication systems is a real signal combined from two real FIR (Finite Impulse Response) filter outputs. Each of the FIRs separately uses the real and imaginary components of the ½ π de-rotated received signal as input. The real-valued output of the SAIC equalizer creates difficulty to estimate and correct the frequency errors due to receiver LO and Doppler shift. Disclosed is an efficient and effective solution to the estimation and correction of the frequency error through an assistant signal generated by two additional FIR filters. The assistant signal and the SAIC equalizer output are used to estimate the frequency error, which is combined with the SAIC equalizer output and the assistant signal to give the frequency error corrected SAIC equalizer output.

19 Claims, 6 Drawing Sheets

FREQUENCY ERROR ESTIMATION AND CORRECTION IN A SAIC LINEAR EQUALIZER

CROSS-REFERENCE TO RELATED APPLICATIONS

The present application is related to the following co-pending U.S. patent applications incorporated herein by reference in their entirety:

Ser. No. 11/205,450, entitled "Modulation Detection In A SAIC Operational Environment", filed on Aug. 16, 2005; and Ser. No. 11/225,282, entitled "Dynamic Switching Between MLSE and Linear Equalizer for Single Antenna Interface Cancellation in a GSM Communication System", filed on Sep. 13, 2005.

BACKGROUND OF THE INVENTION

1. Field of the Invention

The present invention relates in general to digital communication systems and in particular to mobile radio communication systems. Still more particularly, the invention relates to a method of reception and a receiver in a mobile radio system operating in a single antenna interference cancellation environment.

2. Description of the Related Art

The most widespread standard in cellular wireless communications is currently the Global System for Mobile Communications (GSM). GSM employs a combination of Time Division Multiple Access (TDMA) and Frequency Division Multiple Access (FDMA) for the purpose of sharing the spectrum resource. GSM networks typically operate in the 900 MHz and 1900 MHz frequency ranges. For example, GSM-900 commonly uses radio spectrum in the 890-915 MHz bands for the uplink (Mobile Station to Base Transceiver Station) and in the 935-960 MHz bands for the downlink (base station to mobile station), providing 124 RF channels spaced at 200 kHz, and GSM-1900 uses the 1850-1910 MHz bands for the uplink and 1930- 1990 MHz bands for the downlink. The spectrum for both uplink and downlink is divided into 200 kHz-wide carrier frequencies using FDMA, and each base station is assigned one or more carrier frequencies. Each carrier frequency is divided into eight time slots using TDMA. Eight consecutive time slots form one TDMA frame, with a duration of 4.615 ms. A physical channel occupies one time slot within a TDMA frame. Each time slot within a frame is also referred to as a burst. TDMA frames of a particular carrier frequency are numbered, and formed in groups of 26 or 51 TDMA frames called multi-frames.

GSM systems typically employ one or more modulation schemes to communicate information such as voice, data, and/or control information. These modulation schemes may include GMSK (Gaussian Minimum Shift Keying), M-ary QAM (Quadrature Amplitude Modulation) or M-ary PSK (Phase Shift Keying), where M=$2^n$, with n being the number of bits encoded within a symbol period for a specified modulation scheme. The most common modulation scheme, GMSK, is a constant envelope binary modulation scheme allowing raw transmission at a maximum rate of 270.83 kilobits per second (Kbps).

Wireless communication systems are placing an ever-increasing demand on capacity to transfer both voice and data services. While GSM is efficient for standard voice services, high-fidelity audio and data services demand higher data throughput rates. The General Packet Radio Service (GPRS), EDGE (Enhanced Data rates for GSM Evolution) and UMTS (Universal Mobile Telecommunications System) standards have been adopted to increase capacity in GSM systems.

General Packet Radio Service (GPRS) is a non-voice service that allows information to be sent and received across a mobile telephone network. It supplements Circuit Switched Data (CSD) and Short Message Service (SMS). GPRS employs the same modulation schemes as GSM, but higher data throughput rates are achievable with GPRS since it allows for an entire frame (all eight time slots) to be used by a single mobile station at the same time.

EDGE (Enhanced Data rates for GSM Evolution) and the associated packet service EGPRS (Enhanced General Packet Radio Service) have been defined as a transitional standard between the GSM/GPRS (Global System for Mobile Communications/General Packet Radio Service) and UMTS (Universal Mobile Telecommunications System) mobile radio standards. Both GMSK modulation and 8-PSK modulation are used in the EDGE standard, and the modulation type can be changed from burst to burst. GMSK is a non-linear, Gaussian-pulse-shaped frequency modulation, and 8-PSK modulation in EDGE is a linear, 8-level phase modulation with $3\pi/8$ rotation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical.

It is well known that the major source of noise and interference experienced by GSM communication devices operating in typical cellular system layouts (supporting a non-trivial number of users) is due to co-channel or adjacent channel interference. Such noise sources arise from nearby devices transmitting on or near the same channel, as in frequency reuse, or from adjacent channel interference due to spectral leakage, for example. Frequency reuse is a method to increase system capacity by increasing the frequency reuse factor, whereby the communications system allocates the same frequency to multiple cellular sites in closer proximity. Unfortunately, signals intentionally introduced by frequency reuse and other stray signals can interfere with the proper transmission and reception of voice and data signals and can lower system capacity. Additionally, even where no other signal interference is present, the received signal may consist of multiple copies of the transmitted data sequence due to multi-path channel conditions, for example (This effect is sometimes referred to as self-interference). Accordingly, a receiver must be capable of processing and extracting desired information from a signal with strong interference from frequency reuse to retain the advantages of increased capacity.

Traditionally, interference cancellation techniques have had limited success focusing on adjacent channel interference by using several filtering operations to suppress frequencies of the received signal not occupied by the desired signal. Correspondingly, co-channel interference techniques have been proposed, such as joint demodulation, which generally require joint channel estimation methods to provide a joint determination of the desired and co-channel interfering signal channel impulse responses. Given known training sequences, all the co-channel interference can be estimated jointly, however, this joint demodulation requires a large amount of processing power, which constrains the number of equalization parameters that can be used efficiently.

A recently proposed standard for advanced communications systems and receiver algorithms called Single Antenna Interference Cancellation (SAIC) is designed for the purpose of improving system capacity through increasing frequency reuse. SAIC enhances single-antenna receiver performance in the presence of co-channel interference resulting from increased frequency reuse. Current SAIC receiver algorithms are generally optimized for GMSK modulated signals, since gains of SAIC tend to be smaller for 8-PSK modulated signals. In an SAIC operational environment, GMSK traffic on neighboring cells is permitted to reuse common frequencies, thereby significantly increasing network bandwidth, while still being able to tolerate significantly higher co-channel and multi-channel interference than is accommodated by conventional GMSK/EDGE environments. The SAIC operation environment, as defined herein, pertains to (a) the actual physical environment in which the system must operate, which in this case is well encapsulated in the mobile/wireless channel model (plus operating band), and (b) the application and service under consideration as particular attributes.

Frequency error in the received signal includes the Doppler frequency shift over the channel and frequency offset introduced by the local oscillator (LO) within the receiver. For example, with a 1900 MHZ carrier, the maximum Doppler shift for TU50 (as defined in GSM) can be as much as 87 Hz. This frequency error is found to significantly impact the SAIC receiver performance if not corrected. Frequency error estimation is required to be made on a burst-by-burst basis, which the receiver uses to tune it's LO. One of the SAIC solutions is the SAIC linear equalizer. Different from the conventional linear equalizer, SAIC linear equalizer includes two real FIR (finite impulse response) filters, each separately applied to the real and imaginary components of the $\frac{1}{2}\pi$ de-rotated received signal. The two FIR filter outputs are combined into a real-valued signal at the output of the SAIC linear equalizer. Different from a conventional equalizer, the output has real and imaginary components. This framework of the SAIC linear equalizer is unable to provide capacity for frequency error information, and consequently creates difficulty for frequency error estimation and correction. What is needed is an efficient frequency estimation and correction methodology associated with the SAIC linear equalizer that provides superior frequency error estimation and correction in a high interference SAIC operational environment.

BRIEF DESCRIPTION OF THE DRAWINGS

This invention is described in a preferred embodiment in the following description with reference to the drawings, in which like numbers represent the same or similar elements and one or a plurality of such elements, as follows.

In the accompanying drawings, elements might not be to scale and may be shown in generalized or schematic form or may be identified solely by name or another commercial designation.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of electronic devices such as portable digital assistants, digital cameras, portable storage devices, audio players and portable gaming devices, for example. In the description below, any notation $(.)^*, (.)^T, (.)^H, (.)^{-1}$ represents the complex conjugate, transposition, conjugate transposition, and inversion of matrices, respectively.

Figure 1:
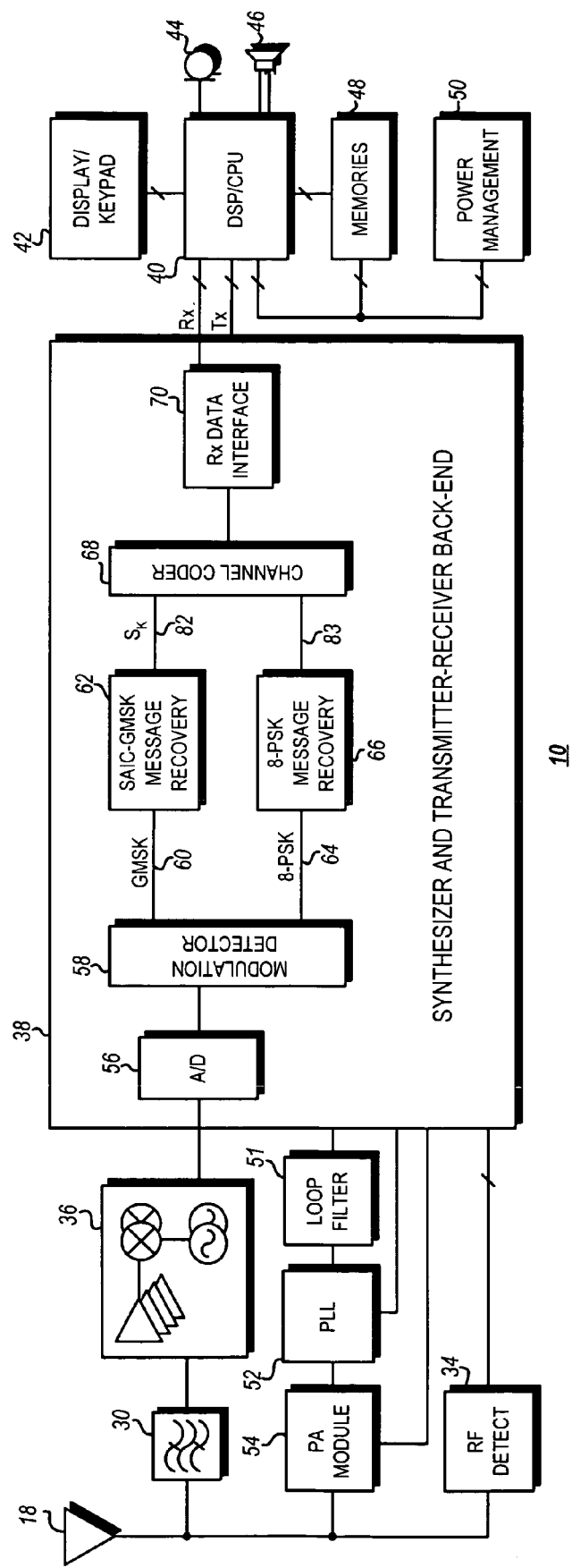
FIG. 1 shows a block diagram of a wireless mobile communication device, in accordance with a preferred embodiment of the present invention.

With reference now to the figures, and in particular in reference to FIG. 1, there is shown a block diagram of a wireless mobile communication device, in accordance with a preferred embodiment of the present invention. In this embodiment, the wireless mobile communication device 10 may be, for example, a cellular handset, a wireless-enabled laptop computer, a one or two-way pager, or some other wireless communication device.

Wireless mobile communication device 10 generally comprises antenna 18 coupled to a filter 30, a power amplifier (PA) 54, and a radio frequency (RF) detector 34. Filter 30 is coupled to receiver (Rx) front-end block 36, which contains standard receiver components such as gain stages, mixers, oscillators, etc., as generally depicted, and mixes the received RF transmission down to base band. Rx front-end block 36 has an output coupled to a synthesizer and transmitter/receiver (Tx/Rx) back-end block 38, which in turn is coupled to a digital signal processor/central processing unit (DSP/CPU) 40 over transmit (Tx) and receive (Rx) connections, or alternatively a communications bus (not shown). The synthesizer and Tx/Rx back-end block 38 is also coupled through loop filter 51 to a phase lock loop (PLL) 52 that generates RF transmission signals for amplification by power amplifier (PA) module 54 and transmission over antenna 18. The receiver front-end block 36 and synthesizer and transmitter/receiver back-end block 38 are preferably integrated circuits (ICs), although other embodiments may be implemented.

DSP/CPU 40 has memories 48 associated therewith, for example read-only memory (ROM) and read/write random access memory (RAM). Various input and output devices are coupled to the CPU, including a display and keypad referenced with a common identifier 42, a microphone 44 and speaker 46. The exemplary embodiment also includes a power management module 50.

Synthesizer and Tx/Rx back-end block 38 is shown containing the block components of a message recovery path coupling Rx front-end block 36 to a receive (Rx) input of DSP/CPU 40. As will be appreciated by those skilled in the art, Synthesizer and Tx/Rx back-end block 38 is comprised of additional components that are not shown in FIG. 1 to simplify the following description of a preferred embodiment. Synthesizer and Tx/Rx back-end block 38 includes a plurality of modules, including blocks 56, 58, 62, 66, 68 and 70, which can be implemented in hardware, software, or a suitable combination of hardware and software, and which, in a preferred embodiment, can be one or more software systems operating on a specific purpose processor platform (not shown) within wireless communication device 10 or, in an alternative embodiment, on DSP/CPU 40. As used herein, a software system can include one or more objects, agents, threads, subroutines, separate software applications, two or more lines of code or other suitable software structures operating in two or more separate software applications, on two or more different processors, or other suitable software architectures.

As seen in synthesizer and Tx/Rx back-end block 38, analog-to-digital (A/D) converter 56 is coupled to Rx front-end block 36 to digitally convert the received transmission signals into data packets. Modulation detector 58 is coupled to A/D converter 56 to receive the digital transmission data from A/D converter 56, and detect the modulation type of a received packet.

In a preferred embodiment, wireless communication device 10 is configured for EDGE operation in either a GMSK or 8-PSK modulation mode. If modulation detector 58 detects GMSK modulation in the received signal, the EDGE burst is output as GMSK signal 60 received by a SAIC-GMSK message recovery block 62, where SAIC algorithms, such as Minimum Mean Square Error Block Linear Equalizer ("MMSE-BLE"), for example, perform message recovery of the GMSK modulated signals in a manner known in the art. Similarly, if 8-PSK modulation is detected by modulation detector 58, the EDGE burst is output as 8-PSK signal 64 to be received by 8-PSK message recovery block 66, where message recovery is performed on the 8-PSK modulated signals in a manner known in the art. As part of the message recovery, each of the message recovery blocks 62, 66 rotates the received packet by the phase rotation factor for the particular modulation being detected in the data path, in this case, each of the two modulation types GMSK and PSK. In the embodiment shown in FIG. 1, SAIC-GMSK message recovery block 62 performs a rotation of π/2 on the received symbols. Similarly, 8-PSK message recovery block 66 performs a rotation of 3π/8 on the received symbols. Accordingly, each of the message recovery blocks 62, 66 generate recovered message packets 82, 83 at their outputs, respectively. Channel decoder 68 is coupled to SAIC-GMSK and 8-PSK message recovery blocks 62, 66 to receive recovered message packets 82, 83 and perform channel decoding thereon, and then forward to Rx (receive) data interface 70, which buffers and transfers decoded packets to DSP/CPU 40 for application processing.

In accordance with a preferred embodiment of the present invention, SAIC-GMSK message recovery block 62 performs SAIC equalization with an efficient implementation of frequency error estimation and correction, which provides significant performance improvement in the SAIC environment. The SAIC equalizer includes two real FIR filters $w_1$ and $w_2$ applied to the real and imaginary portion of the input signal and a combiner of the outputs of the two FIR filters. Different from a conventional equalizer, the output signal of the SAIC equalizer is a real signal, which does not allow derivation of frequency error information. In accordance with a preferred embodiment, assistant information is generated by filtering the real and imaginary portions of the input signal with two additional FIR filters. The outputs of the two additional filters are combined to generate the assistant information. The SAIC output signal and the assistant information are used to derive a metric that is a function of the frequency error and thus produces the frequency error estimate. In a preferred embodiment, the metric is the calculated error energy between the soft and hard information of the frequency error corrected SAIC linear equalizer output. The estimated frequency error is then used for frequency error correction. The frequency error corrected SAIC equalizer output is the combination of the SAIC equalizer output and the assistant information.

Figure 2:
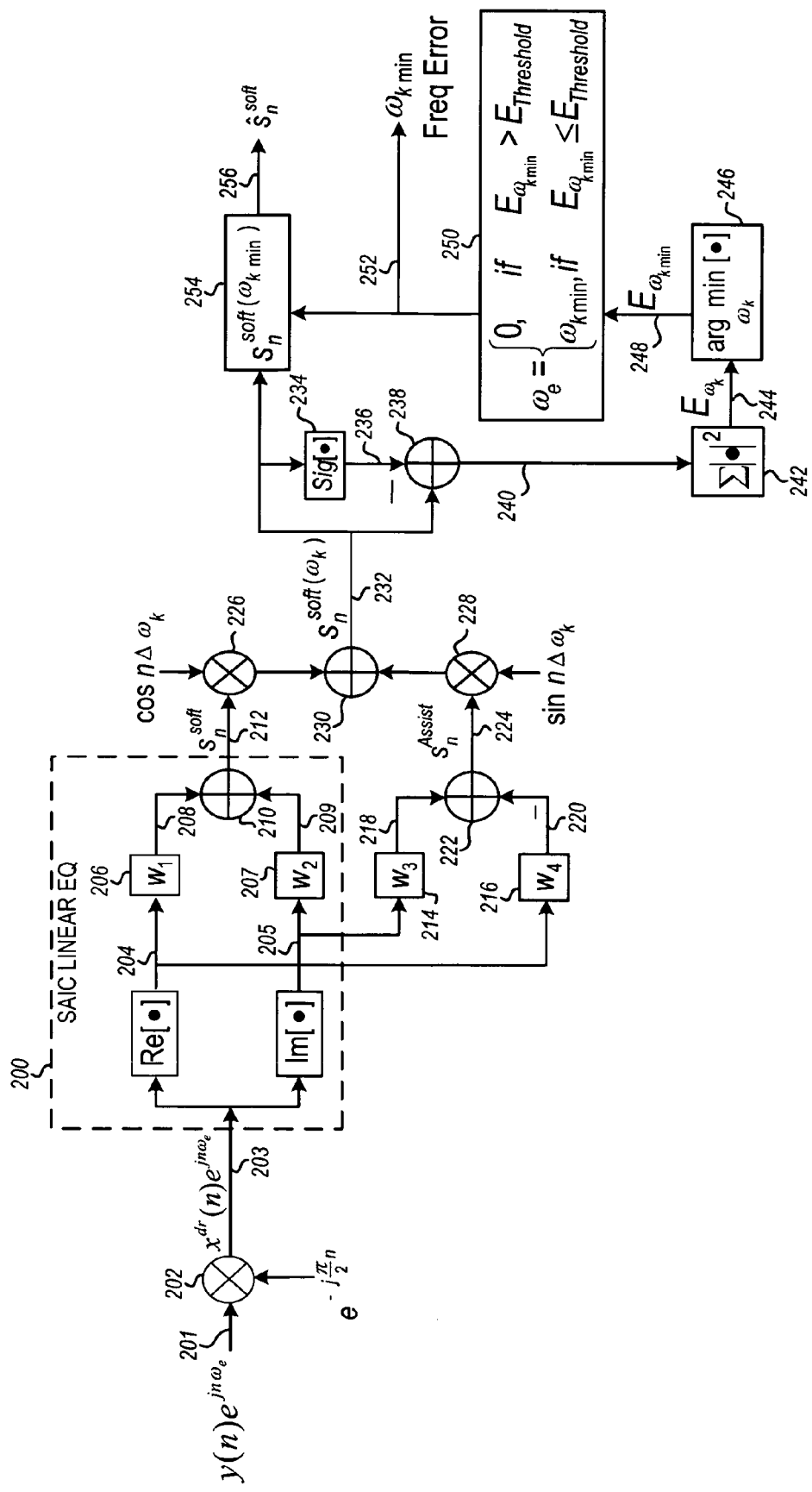
FIG. 2 shows a method for SAIC linear equalization and frequency error detection and correction, in accordance with a preferred embodiment of the present invention.

With reference now to FIG. 2, there is shown a logical flow diagram of a process for SAIC linear equalization and frequency error estimation and correction performed by SAIC-GMSK message recovery block 62 in a receiver of wireless communication device 10, in accordance with a preferred embodiment of the present invention. Each received GMSK burst 60 is a 142 symbol packet that can be represented by the data set {Hard Symbols1, Training Symbols, Hard Symbols2}, where "Hard Symbols1" represents the first 58 symbols, "Training Symbols" represent the next 26 symbols, and "Hard Symbols2" represents the last 58 symbols of the 142 symbol packet. The received GMSK burst 60 is sampled at one sample per symbol, resulting in a series of symbol signals y(n), where n represents each symbol. The incoming symbol signals y(n) have an associated frequency error at each symbol resulting from errors introduced in the local oscillator and through the Doppler shift within the channel, where $\omega_e$ represents the error frequency. Accordingly, the sampled GMSK burst 60 can be represented by $y(n)e^{jn\omega_e}$, or incoming signal 201, as shown in FIG. 2. De-rotation block 202 de-rotates the incoming vector 201 through a rotation of π/2 for each symbol (n) to generate de-rotated symbol signals $x^{dr}(n)$ as follows:

$$x^{dr}(n) = y(n)e^{-j\frac{1}{2}\pi n}$$

The resulting output vector 203 from de-rotation module 202 is the de-rotated symbol signals shifted by the associated frequency error, which may be represented by $x^{dr}(n)e^{jn\omega_e}$. Thereafter, SAIC linear equalizer 200 splits the de-rotated symbol signals into real (204) and imaginary (205) components and passes each through finite impulse response (FIR) filters 206, 207, to generate real outputs 208, 209, respectively. The two real outputs 208, 209 are combined by combiner 210 to generate the SAIC equalizer output $S_n^{soft}$ 212.

The SAIC equalizer output is a real signal, which is unable to be directly used to estimate the frequency error. In the preferred embodiment of the present invention, an assistant signal is created that together with the SAIC equalizer output signal (212) to produce the frequency error estimate. This assistant signal 224 is generated by two additional filters $w_3$ and $w_4$, which filter the real and imaginary portions 204, 205 of the SAIC equalizer input signal 203 to generated filtered signals 218, 220, respectively. Combiner 222 combines signals 218 and 220 to generate the assistant signal 224.

SAIC equalizer output 212 and the assistant signal 224 are combined with injected frequencies to generate the frequency error corrected SAIC equalizer output 232. Frequency error injectors 226, 228 multiplies the SAIC equalizer output 212 by a $\cos(nw_k)$ at injector 226 and the assistant signal by $\sin(nw_k)$, respectively, where k represents the trial frequency index. Combiner 230 combines the frequency injected outputs from frequency injectors 226, 228 to generated frequency error corrected SAIC equalizer output 232. In an alternative preferred embodiment of the present invention, $\cos(nw_k)$ is assumed to be approximately=1, thereby eliminating a multiplier 226, and correspondingly, $\sin(nw_k)$ is assumed to be approximately=$nw_k$ at the input of multiplier 228, thereby simplifying the design.

In a preferred embodiment, the injected test frequency $\omega_k$ is set to at least five test frequencies to provide a search for the frequency error over an expected frequency range. In one preferred embodiment, injected test frequencies $\omega_k$ are set at the values [−100, −50, 0, +50, +100] Hz. In other words, the injected test frequencies are set to a number of possible frequencies to detect the optimal frequency correction for each of the first 58 and last 58 symbols of the 142 symbol packet (testing is not needed on the training symbols). While five frequency trials are used in a preferred embodiment, it will be appreciated that any number of injected test frequencies at any level of frequency granularity can be used to achieve a desired level of accuracy of frequency error detection.

Thereafter, frequency error corrected SAIC equalizer output 232 is coupled to module 234, which takes the sign of each value in the vector of soft information 232 to generate hard bits 236 provided to a negative input of combiner 238 to generate an error signal 240 for each injected test frequency $\omega_k$.

As seen in FIG. 2, module 242 receives error signal 240 and applies a sum-magnitude-squared calculation to calculate a total energy of the error signals as follows:

$$E_{w_k} = \sum_{n=1}^{21} |e_k(n)|^2$$

The error energy $E_{\omega_k}$ 244 represents the energy of error signal 240 for each injected test frequency $\omega_k$ on the received GMSK burst 60. In a preferred embodiment for calculating the error energy ($E_{\omega_k}$) 244, the training sequence (Training Sequence Code) in the mid-amble of the received GMSK burst 60 is not included in the calculation of error signal 244. Detailed analysis shows no significant contribution to frequency error estimation from the training sequence portion of the received GMSK burst 60.

Module 246 selects the frequency trial index that gives the minimum error energy from the 5 error energy trials (k) (i.e., the $\omega_k$ giving the minimum $E_{\omega_k}$). This minimum search operation can be represented as follows:

$\omega_{k\,min}$=arg min$\{E_{\omega_k}\}$

The minimum error energy 248 represents the error energy resulting from the injected test frequency ($\omega_{k\,min}$) providing the minimum error energy for the received GMSK burst 60. In other words, the minimum error energy corresponds to the injected signal 207 that results in the best frequency error correction for the frequency error $\omega_e$.

To reduce the chance of incorrect frequency error correction, the minimum error energy 248 is analyzed at frequency error detection module 250, which compares the minimum error energy 248 with an error energy threshold value, $E_{Threshold}$. If the minimum error energy 248 is greater than the error energy threshold ($E_{Threshold}$), the estimated error frequency may be incorrect. Consequently, if the minimum error energy 248 is greater than the error energy threshold ($E_{Threshold}$), no frequency error correction is made to the received signal (kmin set to the index corresponding to a frequency error of zero Hertz). If the minimum error energy 248 is less than or equal to the error energy threshold ($E_{Threshold}$), there is confidence in frequency $\omega_{k\,min}$ corresponding to the minimum error energy 248 as the frequency error estimate, and, accordingly, outputs the index kmin 252.

Frequency error correction module 254 receives index kmin 252 and SAIC error corrected equalizer output 232, and selects the output 232 corresponding to the index kmin 252 as the final SAIC error corrected equalizer output 256 ($\hat{s}_n^{soft(\omega_k\,min)}$).

Figure 3:
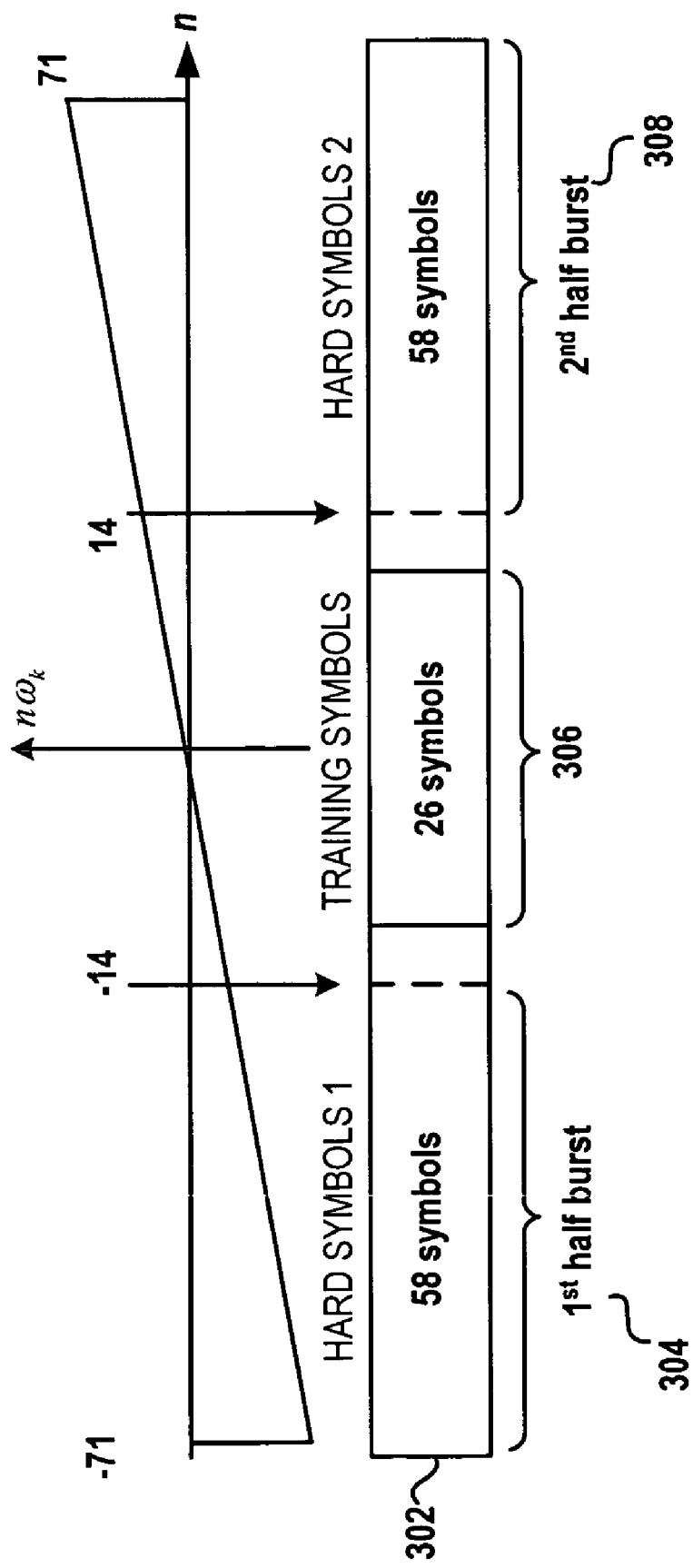
FIG. 3 shows a graphical representation of an efficient implementation of injected test frequency trials over a selected frequency range, in accordance with a preferred embodiment of the present invention.

FIG. 3 shows a graphical representation of an efficient implementation of injecting test frequency trials over a selected frequency range, as used in a preferred embodiment of the present invention to estimate the frequency error in the received signal. The 142 symbol data set 302 represents the received GMSK burst 60, which is broken into a first half 304 containing the first 58 symbols, a mid-amble training sequence code 308 comprising the middle 26 symbols, and a second half 306 containing the last 58 symbols.

FIG. 3 further shows a graph plotting $n\omega_k$ in the y-axis and each symbol (n) in the x-axis, where n corresponds to the 142 symbols in GMSK burst 302 going from −71 to +71. Because, as explained above, the injected test frequency trials are not conducted across the mid-amble 306, n is cycled from −71 through −14 for the first half burst 304 and from +14 through +71 for the second half burst 306. Each tested frequency $\omega_k$ is repeated for each symbol n. In a preferred embodiment, the five frequency trials are performed in accordance with:

$$s_n^{soft(\omega_k)} = s_n^{soft}\cos(n\omega_k) - s_n^{Assist}\sin(n\omega_k), \text{ where } \omega_k = k\Delta\omega,$$

$$\begin{cases} k = -2, -1, 0, +1, +2 \\ \Delta\omega = 2\pi\Delta f \Delta t \\ \Delta f = 50\,\text{Hz} \\ \Delta t = 1/270.83e3 \end{cases}$$

Figure 4:
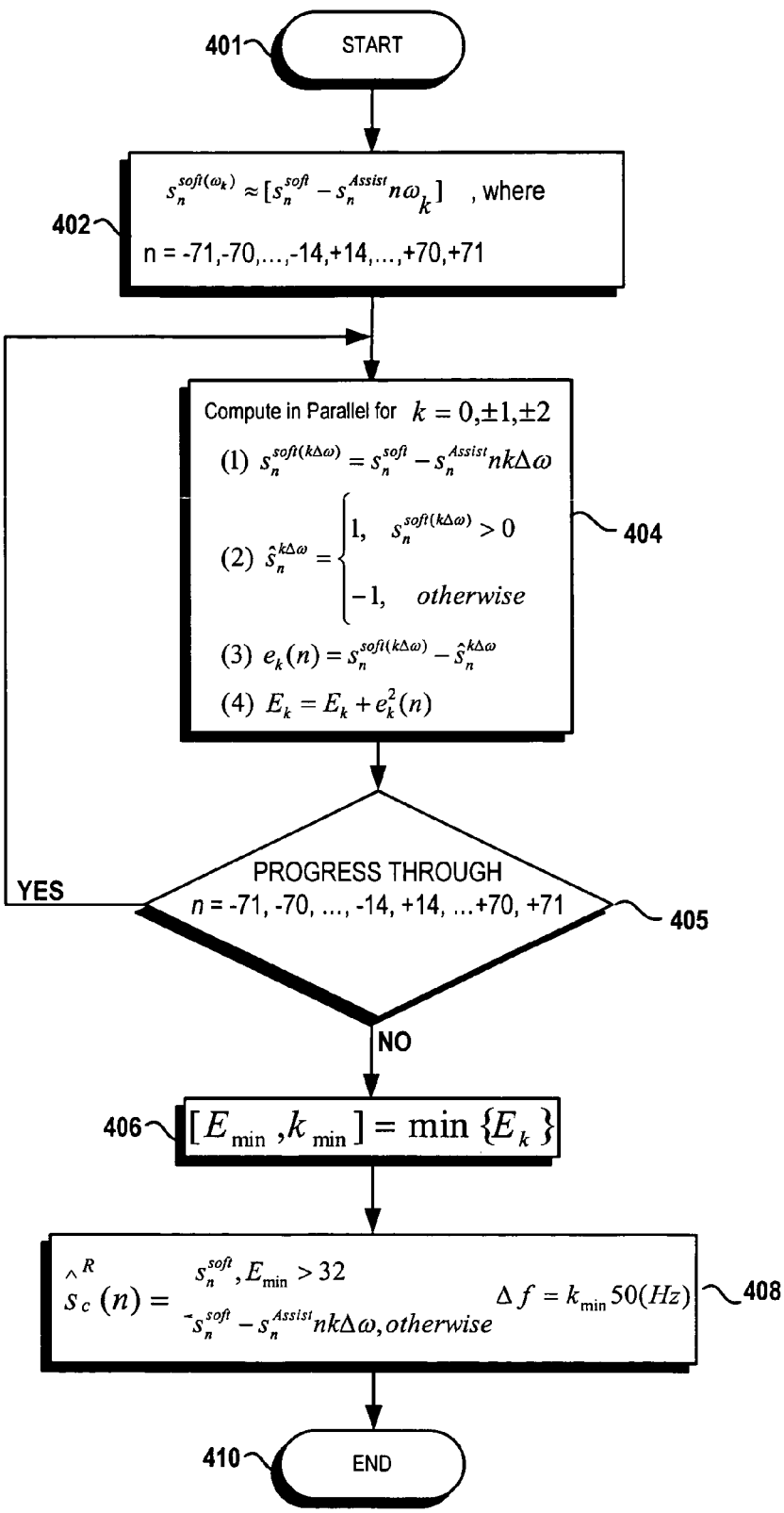
FIG. 4 shows a logical flow diagram of a method for efficient frequency error estimation and correction, in accordance with a preferred embodiment of the present invention.

With reference now to FIG. 4, there is shown a flow diagram of a method for efficient frequency error estimation and correction, in accordance with a preferred embodiment of the preferred invention. The methodology starts at step 401 and proceeds to step 402, where symbol signals are generated from the received burst. Considering the small frequency errors $\omega_k$, approximations are made with $\cos n\omega_k \approx 1$ and $\sin n\omega_k \approx n\omega_k$. Then the frequency correction corresponding to frequency trial $\omega_k$ can be simplified by $s_n^{soft(\omega_k)} \approx [s_n^{soft} - s_n^{Assist}n\omega_k]$, where n=−71,−70, . . . ,−14,+14, . . . ,+70,+71 (the sample index [−71,−70, . . . ,−14] corresponding to the first half of the burst, and the sample index [+14, . . . ,70,71] corresponding to the second half of the burst).

Thereafter, the method proceeds to step 404, where frequency correction and hard decision data are created to generate a frequency error metric for each symbol. As seen at step 404, each of the five frequency test trials are performed in parallel (i.e., k=0,±1,±2). The following are computed in parallel for each of the five frequency trials k=−2,−1,0,+1,+2:

$$s_n^{soft(k\Delta\omega)} = s_n^{soft} - s_n^{Assist}nk\Delta\omega \qquad (1)$$

$$\hat{s}_n^{k\Delta\omega} = \begin{cases} 1, & s_n^{soft(k\Delta\omega)} > 0 \\ -1, & \text{otherwise} \end{cases} \qquad (2)$$

$$e_k(n) = s_n^{soft(k\Delta\omega)} - \hat{s}_n^{k\Delta\omega} \qquad (3)$$

$$E_k = E_k + e_k^2(n) \qquad (4)$$

Equation (1) calculates the frequency corrected soft symbol with the frequency trial $\omega_k$. Equation (2) calculates the hard symbols corresponding to the frequency corrected soft symbols. Equation (3) calculates the error between the soft symbols and hard symbols for the received burst associated with the frequency trial $\omega_k$. Equation (4) cumulates the total error energy of the error associated with the frequency trial $\omega_k$, where n is cycled through n=−71,−70 . . . −14,+14 . . . . +70,+71, which corresponds to the steps 404 and 405. The calculations (1), (2), (3), and (4) are computed in parallel for the indexed symbol at each of the frequency trials k=−2,−1,0,+1,+2. It is easily realized that the calculation of the five error energy values can also be calculated sequentially $E_k$. After n has progressed past the last symbol in the GMSK received burst 60 at step 405, the five estimated error energies $E_k$, k=−2,−1,0,+1,+2 are passed to step 406, where the minimum error energy of the error energies calculated by calculation (4) at step 404 is determined.

Thereafter, the process proceeds to step 408, where if the minimum error energy $E_{min}$ is determined to be greater than a minimum error energy threshold, in a preferred embodiment equal to 32 ($E_{min}$>32), the estimated frequency error is considered not reliable and should be ignored. In this instance, the estimated frequency error of this burst is considered as 0 Hz. Accordingly, the received GMSK burst 60 is processed in message recovery without frequency error correction. Otherwise, if the minimum error energy, $E_{min}$, is determined to be less than or equal to a threshold, the estimated frequency error is considered reliable, and the frequency correction is applied to the burst as described by Equation (1), where $k_{min}$ is the searched index that corresponds to the $E_{min}$. It has been determined that a preferred error energy threshold of 32 be used when, $\Delta f = k_{min}$ 50(Hz). Thereafter, the process ends at step 410.

Figure 5:
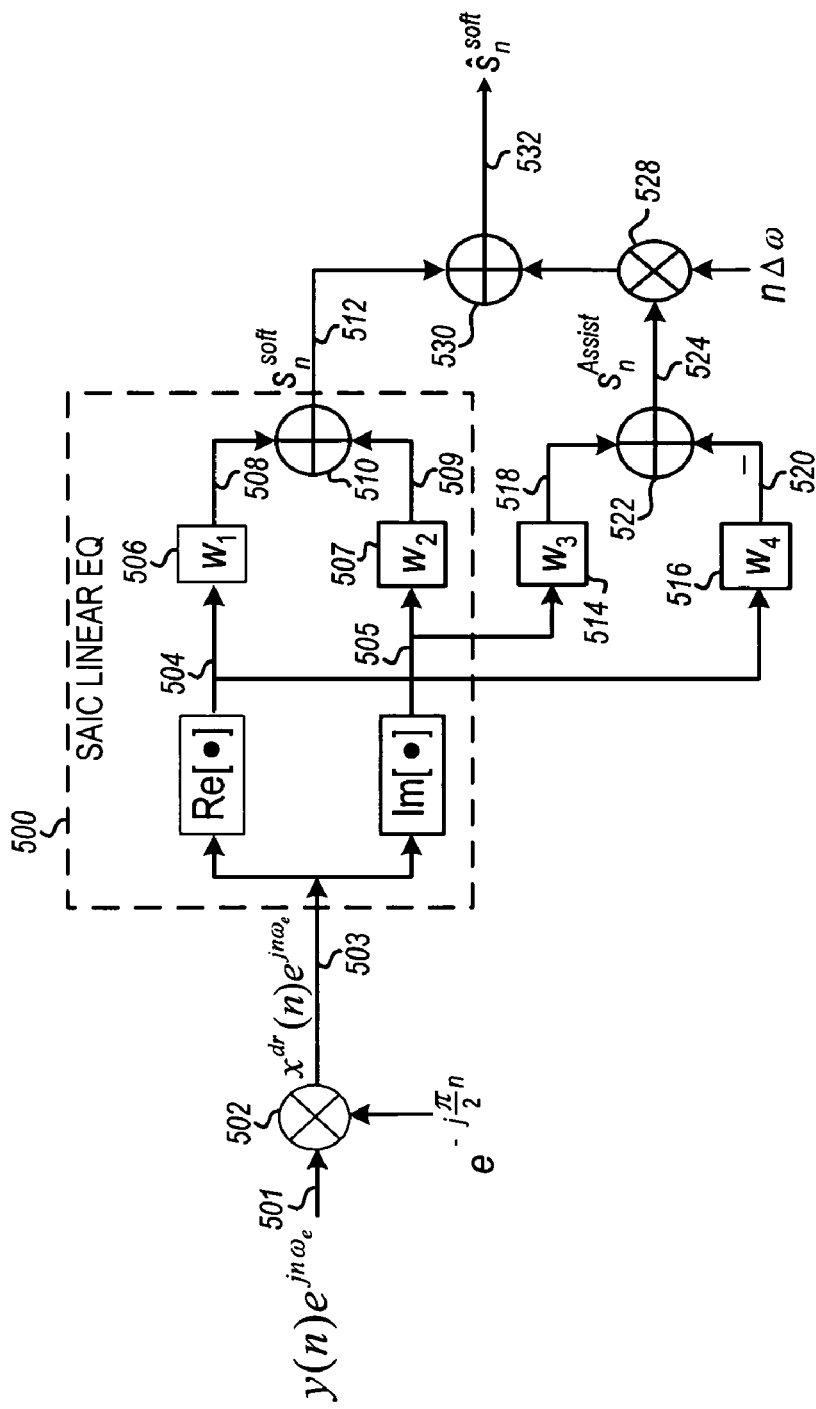
FIG. 5 shows a method for SAIC linear equalization and frequency error detection and correction, in accordance with a preferred embodiment of the present invention.

An alternative solution to estimating the frequency error without the frequency trials is shown in FIG. 5, in an alternative preferred embodiment of the present invention. The incoming symbol signals y(n) have an associated frequency error at each symbol resulting from errors introduced in the local oscillator and through the Doppler shift within the channel, where $\omega_e$ represents the error frequency. Accordingly, the sampled GMSK burst 60 can be represented by y(n) $e^{jn\omega_e}$, or incoming signal 501, as shown in FIG. 5. De-rotation block 502 de-rotates the incoming vector 501 through a rotation of π/2 for each symbol (n) to generate de-rotated symbol signals $x^{dr}(n)$ as follows:

$$x^{dr}(n) = y(n)e^{-j\frac{1}{2}\pi n}$$

The resulting output vector 503 from de-rotation module 502 is the de-rotated symbol signals shifted by the associated frequency error, which may be represented by $x^{dr}(n)e^{jn\omega_e}$, Thereafter, SAIC linear equalizer 500 splits the de-rotated symbol signals into real (504) and imaginary (505) components and passes each through finite impulse response (FIR) filters 506, 507, to generate real outputs 508, 509, respectively. The two real outputs 508, 509 are combined by combiner 510 to generate the SAIC equalizer output $S_n^{soft}$ 512.

The SAIC equalizer output is a real signal, which is unable to be directly used to estimate the frequency error. In a preferred embodiment of the present invention, an assistant signal is created that together with the SAIC equalizer output signal (512) to produce the frequency error estimate. This assistant signal 524 is generated by two additional filters $w_3$ and $w_4$, which filter the real and imaginary portions 504, 505 of the SAIC equalizer input signal 503 to generated filtered signals 518, 520, respectively. Combiner 522 combines signals 218 and 220 to generate the assistant signal 524.

Frequency error injector 528 multiplies each symbol of the assistant signal 524 by the estimated delta frequency for each symbol ($\Delta\omega$). The delta in frequency is calculated as follows:

$$\Delta\omega = -\frac{\sum_n (s_n^{soft} - sig(s_n^{soft}))ns_n^{Assist}}{\sum_n (ns_n^{Assist})^2}$$

Where $s_n^{soft}$ and $s_n^{Assist}$ are the signals 212 and 224 respectively in FIG. 2. The n in summation is cycled through n=−71,−70 . . . . −14,+14 . . . +70,+71, which is identical to that used in the frequency trial approach described above.

Combiner 530 combines the frequency injected output from frequency injector 526 with the SAIC equalizer output signal 512 to generated frequency error corrected SAIC equalizer output 532. In this alternative preferred embodiment of the present invention, calculating error metrics of the frequency trials is not necessary, so soft symbols 232 are taken as the direct output of the equalizer (i.e., output 532 is equivalent to output 256 in FIG. 2), thereby simplifying the design.

Figure 6:
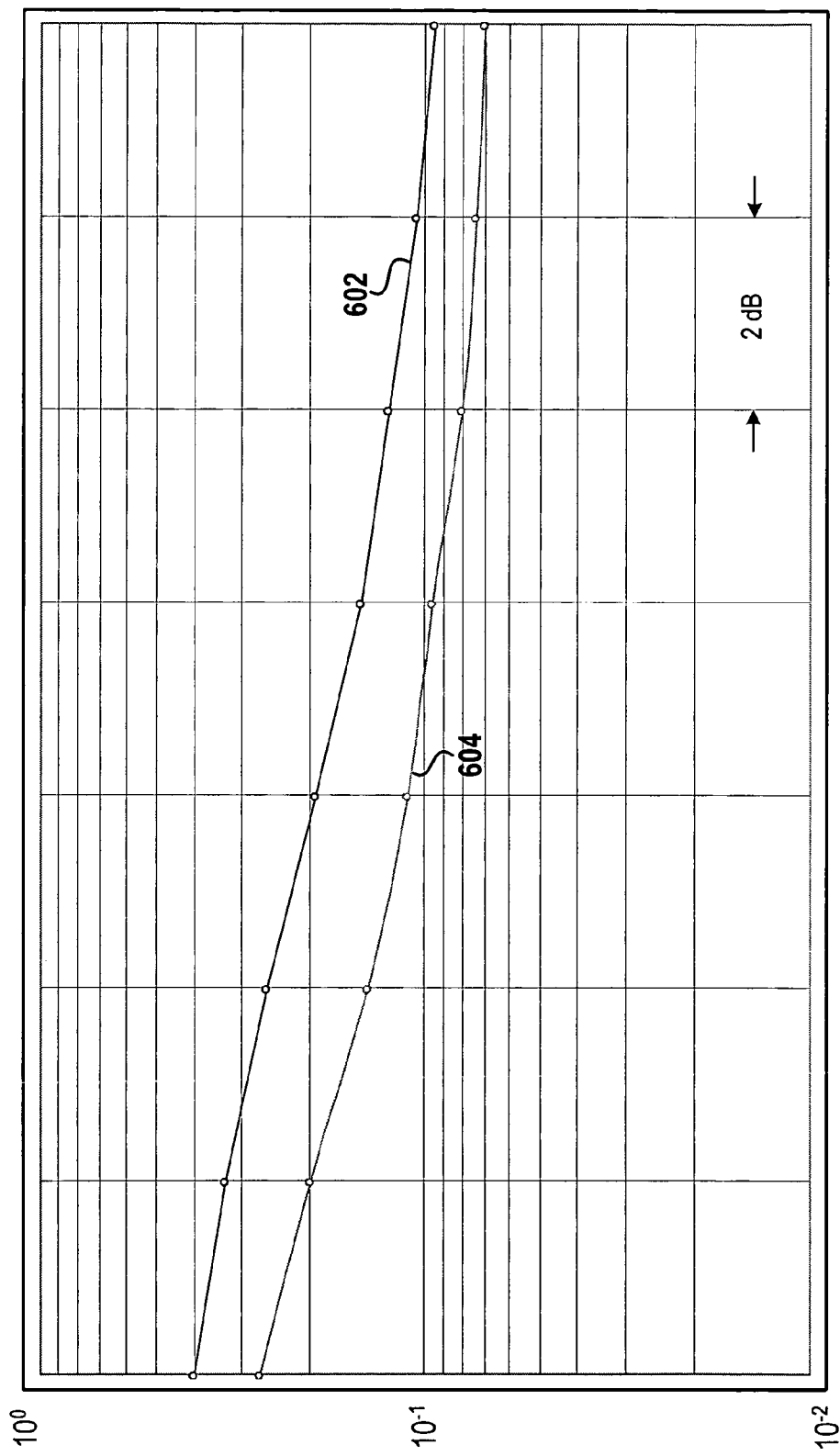
FIG. 6 shows a data plot illustrating the significant gain achieved with the frequency error detection and correction of a preferred embodiment of the present invention.

With reference now to FIG. 6, there is shown a data plot illustrating the significant gain achieved with the frequency error estimation and correction of a preferred embodiment of the present invention. A first curve 602 displays the performance of a conventional linear equalizer, and a second curve 604 displays the performance of a linear equalizer utilizing the frequency error correction of the present invention as disclosed in the preferred embodiments of FIGS. 2, 3, 4 and 5. These performance results show that the system shown in plot 604 has over 5 dB (carrier/interference (C/I)) of signal improvement, making it more than sufficient for SAIC operation.

While a preferred embodiment has been described as utilizing linear equalization on GMSK modulated signals, the present invention is not restricted to correction of GMSK signals or using a linear equalization method in the described manner, and may be implemented using other suitable equalization methods and on other types of modulated signals. In a more general sense, the present invention is applicable to any single tone frequency error estimation and correction methodology.

As will be further appreciated, the processes in preferred embodiments of the present invention may be implemented using any combination of software, firmware or hardware. As a preparatory step to practicing the invention in software, the processor programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. In a digital communication system, a method for frequency error detection and correction of a received signal, said method comprising the steps of:
    equalizing a received signal using a Single Antenna Interference Cancellation (SAIC) equalizer;
    generating an assistant signal derived from real and imaginary components of the received signal;
    combining the equalized received signal and the assistant signal with each of a plurality of test frequencies to generate a set of resulting error corrected signals, each of the error corrected signals of the set being associated with a corresponding test frequency of the plurality of test frequencies;
    calculating a plurality of error metric values, wherein each error metric value of the plurality of error metric values is a function of a difference between a resulting error corrected signal and its corresponding hard symbols for each corresponding test frequency; and
    determining a frequency error of the received signal based on the resulting plurality of error metric values.

2. The method according to claim 1, wherein the step of combining includes (1) multiplying the assistant signal by a sine function of each frequency trial and (2) multiplying the equalized received signal by a cosine function of each frequency trial, and (3) combining the resulting outputs of (1) and (2) to generate the set of resulting error corrected signals.

3. The method according to claim 2, wherein calculating an error metric value comprises calculating the error energy of the difference between the soft symbols and hard symbols for each test frequency.

4. The method according to claim 1, wherein calculating each error metric value of the plurality of error metric values comprises generating an error signal derived from the resulting error corrected signal for each corresponding test frequency, forming a summation of the resulting error signal and squaring a magnitude of the summation to form an error energy as the corresponding error metric value.

5. The method according to claim 4, wherein the step of determining the frequency error further comprises determining the minimum error energy from among the calculated error energies of the plurality of error metric values.

6. The method according to claim 5, wherein the step of determining the frequency error further comprises comparing the minimum error energy with a threshold value.

7. The method according to claim 6, further comprising the step of correcting the frequency of the received signal using the determined frequency error when the minimum error energy is less than the threshold value.

8. The method according to claim 1, wherein the received signal contains data symbols, each data symbol having been rotated through a phase rotation factor corresponding to a modulation type.

9. An article of manufacture comprising a machine-readable medium including program logic embedded therein for performing the steps of claim 1.

10. A receiver in a digital communication system, comprising:
    an equalizer capable of receiving a signal containing a sequence of symbols and performing equalization on the received signal to generate an equalized output;
    a module that generates an assistant signal from the real and imaginary components of the received signal;
    a combiner that combines the equalized output and the assistant signal with a plurality of injected test frequencies to generate a plurality of resulting error corrected signals; and
    a frequency error detector that determines frequency error in the received signal as a function of an error energy value calculated for each of the plurality of injected test frequencies, wherein each error energy value is calculated based on a difference between soft and hard symbols of a resulting error corrected signal of the plurality of resulting error corrected signals for a corresponding one of the plurality of injected test frequencies.

11. The receiver according to claim 10, wherein the frequency error detector further performs frequency error correction by determining the minimum error energy value from among the calculated error energy values for each of the plurality of injected test frequencies, and correcting the frequency of the received signal based on a corresponding one of the plurality of injected test frequencies corresponding to the minimum error energy value.

12. The receiver according to claim 10, further wherein the combiner performs (1) multiplying the assistant signal with a sine function of each injected test frequency, (2) multiplying the equalized received signal with a cosine function of each injected test frequency, and (3) combining the resulting outputs of (1) and (2) to generate the resulting error corrected signal of the plurality of resulting error corrected signals.

13. The receiver according to claim 10, wherein the frequency error detector further generates an error signal from the resulting error corrected signal for each corresponding injected test frequency, forms a summation of the resulting error signal, and squares a magnitude of the summation to form the error energy value corresponding to the test frequency.

14. The receiver according to claim 13, wherein the frequency error detector compares the minimum error energy value with a threshold value and corrects the frequency of the received signal based on the injected test frequency corresponding to the minimum error energy value when the minimum error energy value is less than the threshold value.

15. The receiver according to claim 10, wherein the module that generates an assistant signal from the real and imaginary components of the received signal comprises two finite impulse response filters.

16. The receiver according to claim 11, wherein the digital communications system is Global System for Mobile Telephony (GSM) compliant.

17. In a digital communication system, a method for frequency error detection and correction of a received signal, said method comprising the steps of:
    equalizing a received signal using a Single Antenna Interference Cancellation (SAIC) equalizer;
    generating an assistant signal derived from real and imaginary components of the received signal;
    combining the equalized received signal and the assistant signal with a delta frequency to generate error corrected signals, wherein combining includes (1) multiplying the assistant signal ($s_n^{Assist}$) by the delta frequency ($\Delta\omega$) and (2) combining the resulting outputs of (1) with the equalized received signal ($s_n^{soft}$) to generate the error corrected signals.

18. The method according to claim 17, wherein the delta frequency ($\Delta\omega$) is calculated as:

$$\Delta\omega = -\frac{\sum_n (s_n^{soft} - sig(s_n^{soft}))ns_n^{Assist}}{\sum_n (ns_n^{Assist})^2}$$

Where, n=−71, −70 ... −14, +14 ... +70, +71 for associated symbols in the received signal.

19. An article of manufacture comprising a machine-readable medium including program logic embedded therein for performing the steps of claim 17.

* * * * *